United States Patent [19]

Carlqvist et al.

[11] Patent Number: 4,539,674
[45] Date of Patent: Sep. 3, 1985

[54] METHOD OF PROVIDING ADAPTIVE ECHO CANCELLATION IN TRANSMISSION OF DIGITAL INFORMATION IN DUPLEX, AND APPARATUS FOR PERFORMING THE METHOD

[75] Inventors: Bengt R. Carlqvist, Bromma; Lars T. E. Svensson, Skärholmen, both of Sweden

[73] Assignee: Telefonaktiebolaget LM Ericsson, Stockholm, Sweden

[21] Appl. No.: 514,825

[22] PCT Filed: Nov. 2, 1982

[86] PCT No.: PCT/SE82/00363
§ 371 Date: Jun. 16, 1983
§ 102(e) Date: Jun. 16, 1983

[87] PCT Pub. No.: WO83/01716
PCT Pub. Date: May 11, 1983

[30] Foreign Application Priority Data

Nov. 2, 1981 [SE] Sweden .................................. 8106444

[51] Int. Cl.³ .............................................. H04B 3/24
[52] U.S. Cl. .................................. 370/32; 179/170.2; 179/170.6
[58] Field of Search .......................... 179/170.2, 170.6; 370/32

[56] References Cited

U.S. PATENT DOCUMENTS 4,074,086 2/1978 Falconer et al. .................. 179/170.2
4,425,483 1/1984 Lee et al. .......................... 179/170.8

OTHER PUBLICATIONS

Mueller, Kurt H., "A New Digital Echo Canceler for Two-Wire Full-Duplex Data Transmission", IEEE Transactions on Communications, vol. COM-24, No. 9, Sep. 1976.

Primary Examiner—Robert L. Griffin
Assistant Examiner—Timothy K. Greer
Attorney, Agent, or Firm—Roberts, Spiecens & Cohen

[57] ABSTRACT

A method and an apparatus, in a telecommunication system for transmission of digital information in duplex over a signal conductor pair for automatically adjusting a balance filter included in a hybrid coupler circuit with the aid of adaptive echo cancellation so that the local data transmitter does not disturb the local data reception, without utilizing any particular testing procedure in initiating the adaptive echo cancellation. A control signal ($\epsilon_k$) is formed, with the help of which the correction unit (KB) is caused to generate signals for rapid updating of the balance filter (B) parameters, in spite of that knowledge is lacking in the initiation instant concerning the value of the signal transmitted from the remote end to the apparatus, and that no counteraction between level correction and filter adaption is obtained. The apparatus includes a quantizer (Q) in which a sampled, received signal ($r_k$) is quantized, an estimated signal ($\hat{a}_k$) of data sent from the remote end being obtained. Said estimated signal is multiplied by a reference signal from a reference unit (V), the result being subtracted from the received signal ($r_k$) so that an error signal ($e_k$) is formed. The sign of the error signal is correlated with the estimated signal ($\hat{a}_k$) in a correction unit (KV), which calculates a correction ($\Delta V$) which is added to the reference signal in order to correct it. The sign of the error signal ($e_k$) is also added to the estimated signal ($\hat{a}_k$) thereby forming said control signal ($\epsilon_k$) which is correlated with the data vector ($b_k$) in the correction unit (KB) which calculates a correction value ($\Delta c$) which is supplied to the input of the balance filter for correction of the filter parameters.

2 Claims, 8 Drawing Figures

METHOD OF PROVIDING ADAPTIVE ECHO CANCELLATION IN TRANSMISSION OF DIGITAL INFORMATION IN DUPLEX, AND APPARATUS FOR PERFORMING THE METHOD

TECHNICAL FIELD

The present invention relates to a method of providing adaptive echo cancellation in transmission of digital information in duplex over a single pair of conductors. The invention also relates to apparatus for performing the method.

BACKGROUND ART

Adaptive echo cancellation is provided in telephony and data communication engineering to prevent echo signals from affecting the reception. For example, in a data modem connected to a two-wire line, the transmitter in one of the two-wire directions and the receiver in the other are connected to the two-wire line via a hybrid coupler, data ($b_k$) being sent from the transmitter across the line to a modem at the remote end, while conversely, data ($a_k$) is transmitted from the remote end across the line to the local modem receiver. Due to deficiencies in the hybrid coupler, it is unavoidable that a certain proportion of data flow ($b_k$) from the transmitter passes through the hybrid coupler and into the receive path, reception of the data flow ($a_k$) thus being disturbed. Furthermore, disturbing signals occur in the form of echoes from the local transmission at the remote end, but the leak signals through the coupler are the ones which dominate and which most heavily affect the reception. These leak signals coming from the local data flow ($b_k$) and occurring in the local modem detector as disturbance signals are usually called echo signals, even if they have not been transmitted across the line, reflected and transmitted back again to the local modem.

In order to reduce the effect of such echo signals it is known in the prior art to provide a digital-type balance filter, usually a finite impulse response (FIR) filter connected to the transmit and receive channels. The task of the balancing filter is accordingly to form a signal from the transmitting data flow, this signal being subtracted from the one which occurs at the detector input, after having passed through the hybrid coupler, and which contains leak signals from the transmit channel. For rapidly adjusting the balance filter parameters, i.e. provide rapid convergence in the balance filter, it is however required that the correlation between the incoming analogue signal in the receive path (denoted below $w(t) + h(t)$) and the transmitted data flow $b_k$ be great. The presence of the remote signal $w(t)$ coming from the data flow ($a_k$) decreases this correlation however, and convergence is slow.

Rapid convergence of the balance filter thus requires that the analogue remote signal $w(t)$ be eliminated in some way when calculating the parameter adjustment. A known method of eliminating or cancelling signal $w(t)$ is to ensure that the remote end transmitter is disconnected during a test period when the adjustment of the balance filter can be carried out. Transmission quality will then be entirely dependent on how successful the adaption has been during the test period. The test period must be made relatively long. It would be more effective if signal $w(t)$ could be subtracted from incoming signal $w(t) + h(t)$. In digital transmission signal $w(t)$ only attains a limited number of amplitude values at the sampling instants (if intersymbol interference is neglected). An estimation $w(k)$ of signal $w(t)$ can therefore be made in the sampling instants k with the aid of a quantizer.

Since the cable attenuation is normally not known, some form of automatic level adjustment must be made for obtaining a good estimate. Different systems with adaptive balance filters and adaptive level adjustments have been described, e.g. in "Adaptive Echo Cancellations/AGC Structures for Two Wire, Full Duplex Data Transmission", Bell System Techn. Journal 58 No. 7 (September, 1979), the level adjustments utilize correlation of the received signal with a level estimation $â_k$ of the data sequence transmitted from the remote end. The methods operate if this estimation is more or less correct. The leak signal $h(t)$ is however much larger than signal $w(t)$ in many practical cases. When the balance signal $r(t)$ passes the heavily non-linear quantizer incorporated in the receiver, all the information concerning signal $w(t)$ may be lost if the balance filter is not correctly adjusted. In such cases $â_k$ will be more heavily correlated to data flow $b_k$ than to data flow $a_k$. This has the practical result that the adaption of the balance filter and adaption of the level counteract each other and convergence cannot be obtained.

DISCLOSURE OF INVENTION

An object of the present invention is to provide a method for adjusting a digital-type balance filter, e.g. one incorporated in a data modem with rapid convergence, without special test periods and without needing to resort to adaptive level adjustments.

In summary, the inventive method contemplates forming, from the data flow including both remote signal $w(t)$ and echo signal $h(t)$ coming into the modem, correction signals to the balance filter only when the level of the incoming flow exceeds a given reference value, so that the filter is only corrected when the incoming signal level exceeds the reference value. This contemplates disconnecting the remote signal, and rapid convergence (apart from an acceptable residue error) of the balance filter is enabled.

The method in accordance with the invention is characterized as will be seen from the characterizing portion of claim 1.

DESCRIPTION OF DRAWINGS

The invention will now be described with reference to the appended drawings, where.

BEST MODES FOR CARRYING OUT THE INVENTION

Figure 1:
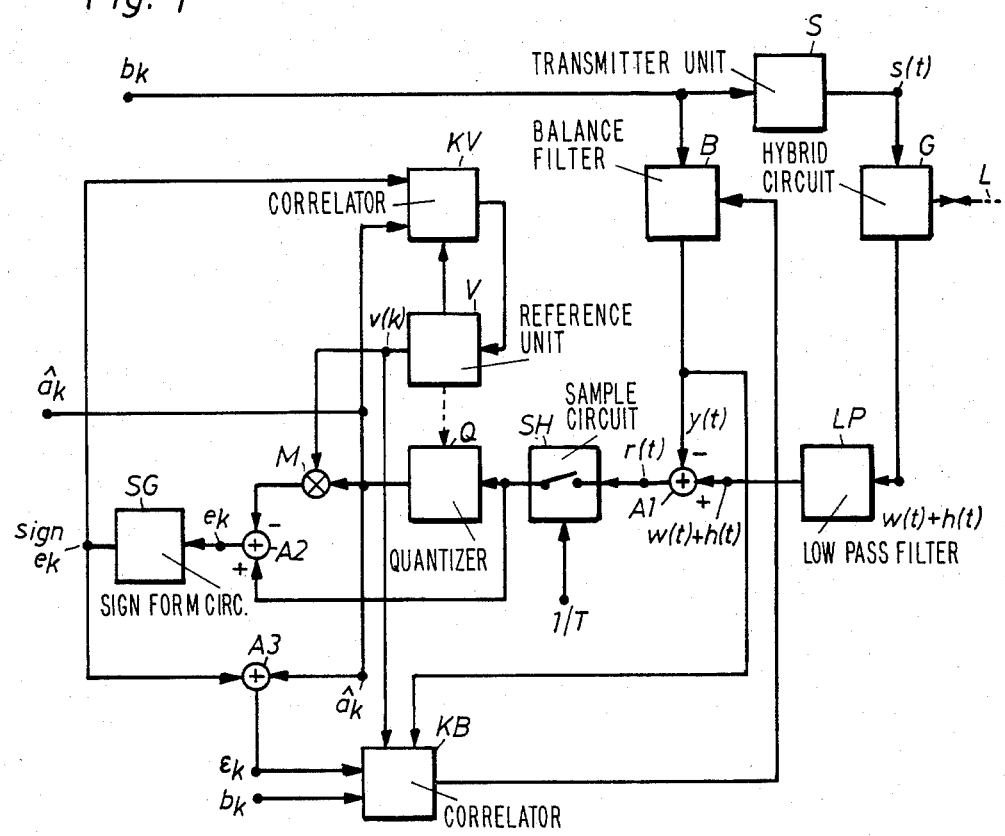
FIG. 1 is a block diagram of a data modem utilizing the method in accordance with the invention.

The principle of the inventive method is illustrated in FIG. 1. A data sequence $b_k$, comprising ones alternating with zeroes is sent from an unillustrated data source, e.g. a telephone exchange, to a transmitter unit S including a code converter for conversion of the binary flow $b_k$, e.g. to biphase coded (analogue) signals $s(t)$, see FIG. 3. The transmitter unit S is connected to a hybrid coupler G of known kind, which feeds the biphase coded signal $s(t)$ out onto a two-wire line L. The apparatus illustrated in FIG. 1 may be a part of a modem for data transmission, the outgoing data being the binary flow $b_k$. The data sequence coming into the modem from the remote end of the line L is denoted $a_k$, and is transmitted from the remote end across the line L simultaneously as the data sequence $b_k$ is transmitted from the transmitter unit S across the line L to the remote end. The flow $a_k$ from the remote end occurs in this assumed case as an analogue signal $w(t)$ (biphase coded) across the input terminal of the hybrid coupled G from the line L. In passing through the coupler G there is added an echo signal $h(t)$ coming from the biphase coded signal $s(t)$ from the transmitter S. The signals $s(t)$ and $h(t)$ are thus heavily correlated. Across the input of a summing circuit A1 there is thus obtained a signal $w(t)+h(t)$ after filtering in the lowpass filter LP. For inhibiting the effect of the echo signal $h(t)$, a balance filter B, suitably a FIR filter, is connected across the input to the transmitter unit S and to a minus input of the summing circuit A1. The balance filter B sends a signal $-y(t)$ to the summing circuit A1, intended to compensate the echo signal $h(t)$, i.e. $r(t)=y(t)+w(t)+h(t) \approx w(t)$. The signal $r(t)$ is applied to the sampling circuit SH, for sampling the signal $r(t)$ in selected sampling instants $t_k$ so that the signal $r(k)=r(t_k)$ is formed. The data flow $b_k$ together with the corresponding biphase coded signal $s(t)$ after the transmitter S and the leak signal $h(t)$ are shown in FIG. 3.

The signal $h(t)$ derived from the signal $s(t)$ from the transmitters is heavily correlated to this signal and, at least at the beginning of transmission, is very much stronger at the input to the lowpass filter LP than the remote signal $w(t)$. The balance filter B should thus send a signal $y(t)$ which is also heavily correlated to the signal $s(t)$.

Figure 3:
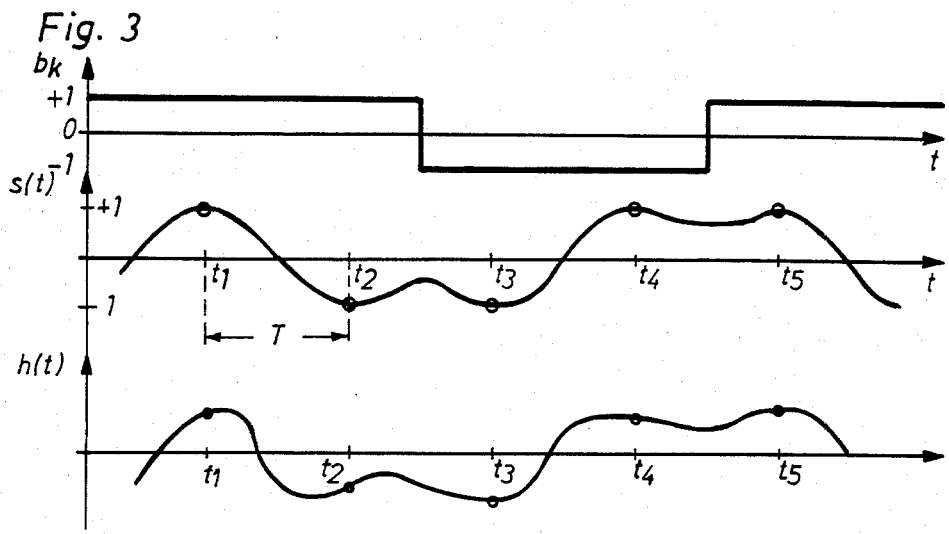
FIG. 3 depicts in a time diagram examples of a binary data flow transmitted from the remote end, corresponding to a biphase coded signal and an echo signal to the modem receive side.
Figure 4:
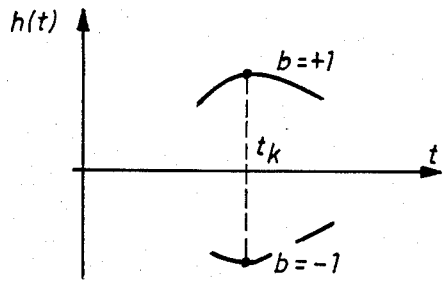
FIG. 4 depicts in a diagram sampled values from the echo signal mentioned.
Figure 5:
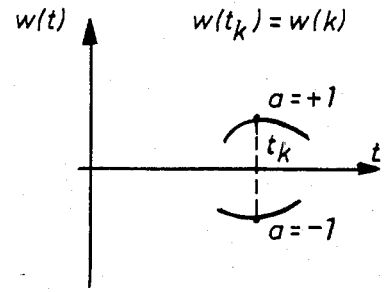
FIG. 5 is a diagram of sampled values ±1 from the remote signal on reception.
Figure 6:
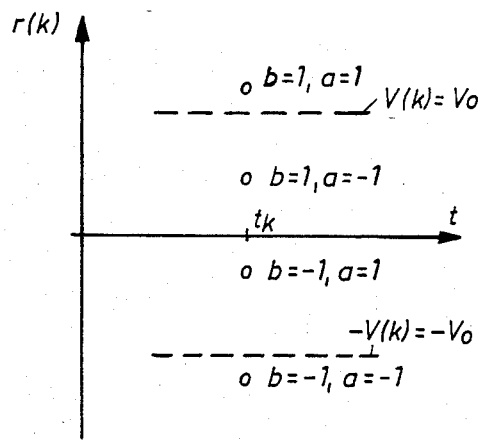
FIGS. 6–7 are diagrams of sampled values from the echo signal and remote signal in comparison with a variable reference level.
Figure 7:
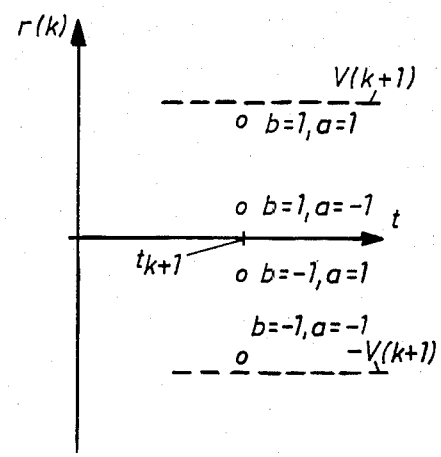

After sampling the signal $r(t)$ in the sampling circuit SH, the values $r(k)$ ($k=1,2 \ldots N$) are obtained at the instants $t_1, t_2, \ldots$ according to the diagram in FIG. 3. For a correctly adjusted balance filter B, the input signals $r(k)$ to the detector or quantizer Q will be independent of the transmitted data sequence $b_k$ at the sampling instants $t_k$, i.e. $y(t_k)$.

The detector Q is a quantizing circuit which, for the sake of simplicity, should be considered here as comprising a comparator deciding whether the sampling values $r(k)$ are greater or less than zero. The quantity $\hat{a}_k$ across the output of the quantizer Q is $+1$ if $r(k) > 0$ or $-1$ if $r(k) > 0$, and gives an estimation of the data $a_k$ sent from the remote end.

The block V is a reference unit in which a reference value is stored in digital form and may include a digital-to-analogue converter. The output of the unit is connected to one input of a multiplier M, the other input of which is connected to the output of the quantizer Q. One input of a second summing circuit A2 is connected to the output of the multiplier, and the other input of the second summing circuit is connected to the input of the quantizer Q. The output of the summing circuit A2 is connected to a sign-forming circuit SG. The output of this is connected to a third summing circuit A3 and to one input of a correction unit KV for correcting the reference value stored in the reference unit V. The correction unit KV is connected by its second input to the output of the quantizer Q and may be a multiplier, for example. A third input to the correction unit KV connected to the reference unit V is supplied with the reference value from this unit and the new, possibly corrected value is supplied to the reference unit V via the output of the correction unit KV whose output is connected to the reference unit V. The reference levels in the reference unit V may possibly control the levels in the quantizer Q as indicated by the dashed connection.

An estimated value $\hat{a}_k$ (1 or $-1$) of data $a_k$ transmitted from the remote end thus occurs across the output of the quantizer Q. After multiplying with a reference value $v(k)$ in the multiplier M, there is obtained on the output of the summing circuit A2 a value $e_k = r(k) - \hat{a}_k \cdot v(k)$. In the case where $w(t)$ is a biphase-modulated signal, $\hat{a}_k = \pm 1$, and two values of $e_k$ can be obtained thus:

$$e_k = r(k) - v(k) \; (\hat{a}_k = +1)$$

or $$e_k = r(k) + v(k) \; (\hat{a}_k = -1)$$

The sign of $e_k$ is obtained across the output of the circuit SG, and it may thus be $\pm 1$. The sign of the error signal $e_k$ is correlated with the value $\hat{a}_k$ in the correction unit KV, which computes a correction for adding to $v(k)$. The sign of $e_k$ obtained across the output of the unit SG denotes whether the value $\hat{a}_k \cdot v(k)$ was greater or less than the sampled value $r(k)$. The value $r(k)$ in turn denotes how near the received signal $r(t)$ the received signal $w(t)$ comes, after having passed the hybrid coupler (addition of $h(t)$) and after the subtraction of the signal $y(t)$ from the balance filter. The sign of $e_k$ is summed in the summing circuit A3 to $\hat{a}_k$, and is supplied via a first input to a second correction unit KB for the balance filter B. There is furthermore supplied to this unit, via a second and a third input, the reference level $v(k)$ and the balance filter parameters $c_j(k)$. The correction unit KB then calculates the new parameters $c_j(k+1)$ of the filter B, which occur on the output connected to a control input of the filter B. Correlation of the quantity $\epsilon_k = \text{sign } e_k + \hat{a}_k$ with the data flow $b_k$ is performed in the correction unit KB (a correlator), the relationship between the estimated value of the remote signal $w(t)$ represented by sign $e_k + \hat{a}_k$ and the transmitted data flow $b_k$ is established. If the correction unit KB finds that the quantities $\epsilon_k$ and $b_k$ are correlated, i.e. that there is an undesirable relationship between received data $\hat{a}_k$ and data flow $b_k$, the parameters $c_j$ of the balance filter will be corrected so that this correlation decreases. On the other hand, if the magnitudes $\epsilon_k$ and $b_k$ are uncorrelated there is no relationship between $\hat{a}_k$ and $b_k$. The balance filter may then be considered converged and the corrections will not change the adjustment of the parameters $c_j$.

Figure 2:
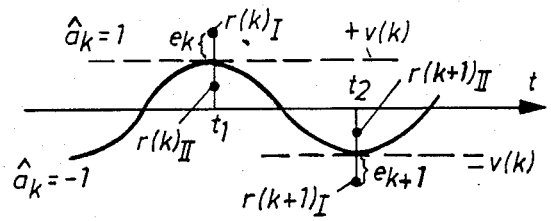
FIG. 2 is a time diagram of a remote signal.

FIG. 2 illustrates the relationship between the sampled received signal $r(k)$, the remote signal $w(t)$, the reference level $v(k)$ and the error signal $e_k$. At the sampling instants $t_1$ it is assumed in the one case that $r(k)=r(k)_I$ and $a_k=+1$, $e_k$ will then be greater than zero and the sign of $e_k$ is $+1$. In the other case when $r(k)=r(k)_{II}<v(k)$, $e_k$ is less than zero and the sign of $e_k$ is $-1$. In a corresponding manner it is found that for $a_k=-1$, $e_{k+1}$ is less than zero when $r(k+1)=r(k+1)_I$ and $e_{k+1}$ is greater than zero when $r(k+1)=r(k+1)_{II}$. As will be described below, there is correction of the balance filter B when $e_k$ is greater than zero and when $e_{k+1}$ is less than zero.

As mentioned above, the balance filter B is of the FIR type, i.e. the output signal in every instant is solely dependent on a limited number N samples of the input signal, i.e. the data sequence $b_k$. The filter function is determined by its parameters $c_1 \ldots c_M$ and N consecutive input signal values $b_k, b_{k-1} \ldots b_{k-N+1}$ the (digital) output signal $$Y_k = \sum_{j=1}^{N} c_j b_{k-j}$$

and y(t) is the corresponding analogue signal.

Figure 8:
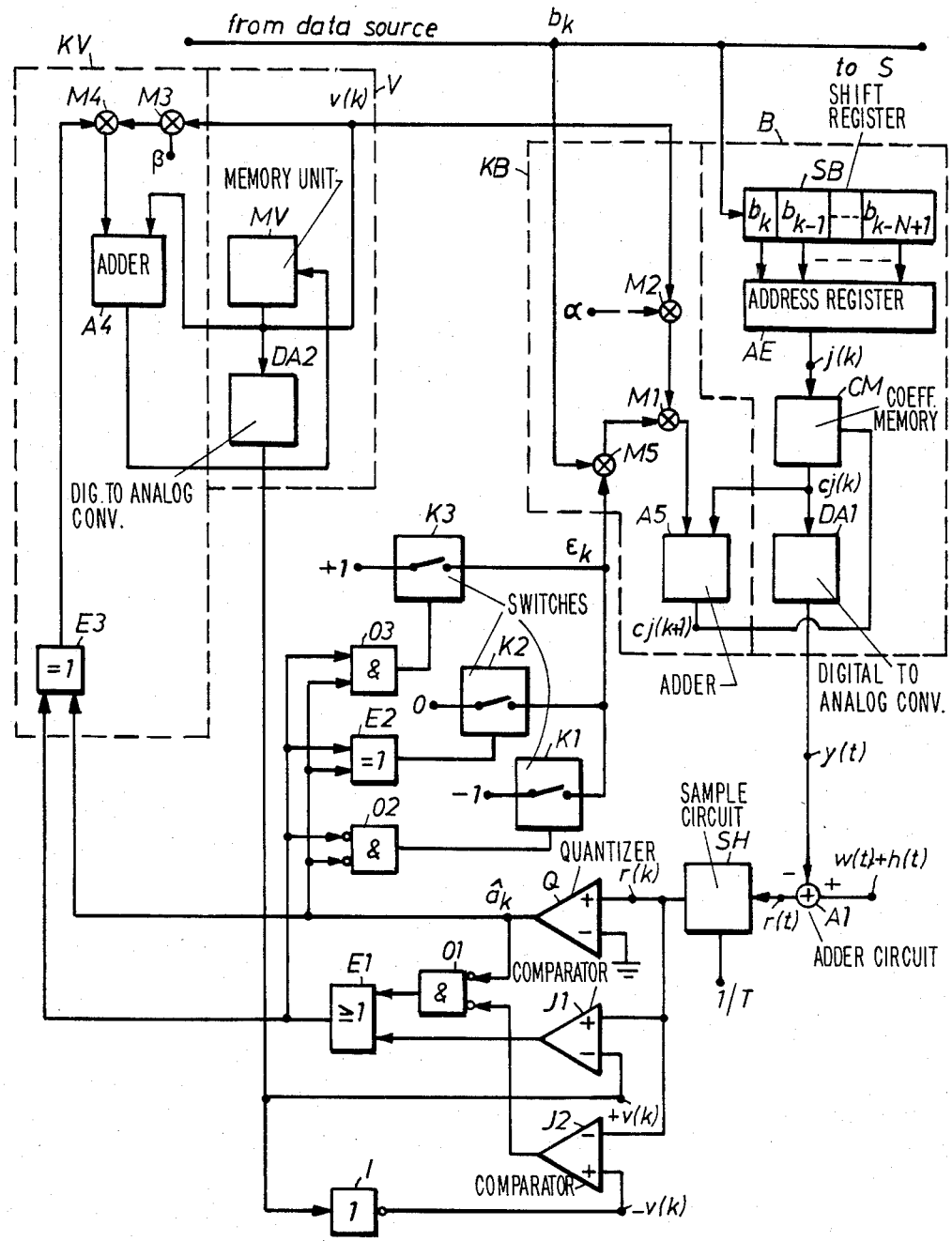
FIG. 8 is a block diagram over a preferred embodiment of an apparatus in accordance with the invention.

As described in conjunction with FIG. 8, the balance filter may also be a so-called memory filter in which the coefficients $c_j$ are stored and are pointed out by an address $j=a(b_k)$. The digital output signal $y_k$ will then be the coefficient $c_j(k)$.

The method in accordance with the invention will now be described in detail with reference to the FIGS. 4–7, illustrating the case of a transmitted data flow $b_k$ from the transmitter S which consists of alternating $+1$'s and where solely one coefficient $c_1$ in the filter B is updated. If $b_k=1$ it is assumed h(t) according to FIG. 4 takes on the value $b=+1$ simultaneously as it is assumed that the value of the remote data flow $w(t)=+1$. The correction y(t) is assumed $=0$. Thus r(k) will be $=w(k)+h(k)=a+b=2$, according to FIG. 6 ($a=1$, $b=1$), a given level $v(k)=V_o$ being the value of r(k). In such a case $â_k=1$, $â_k \cdot v(k)=V_o$, $e_k=r_k-V_0>0$, the sign $e_k=+1$ and $\epsilon_k=1+1=+2$. Since $\epsilon_k$ and $b_k$ are both positive, a positive correction of the coefficient will be calculated. Simultaneously the correction unit KV indicates that the error of the reference level is positive, and the reference level v(k) must be increased. When the coefficient $c_1$ is now increased to $c_2$ simultaneously as the reference level v(k) is increased, the value of $r(k)=w(k)+h(k)-y(k)$ will come closer to the new level $v(k+1)$ according to FIG. 7 ($b=1$, $a=1$) and the balance filter will begin to converge. If it is assumed that the data flow $a_k$ and $b_k$ are such that $a=-1$ (a represents remote data) and $b=+1$ (represents the leak signal h(t)), then according to FIG. 6, r(k) will take on a value less than $v(k)=V_0$. In such a case: $e_k=r(k)-V_o<0$, sign $e_k=-1$ and $\epsilon_k=-1+1=0$. The fact that the error signal is less than zero and that $\epsilon_k=0$ implies that the reference level shall be increased but that the coefficient c shall be retained unchanged. For the cases $a=1$, and $a=-1$, $b=-1$ there is respectively obtained that the reference level shall be decreased with the coefficient $c_1$ retained unchanged and that the reference level shall be increased with the coefficient $c_1$ increased. By way of summary, the situation with the proposed method is that if the absolute value of the signal values r(k) is greater than a given reference level v(k), both reference level shall be increased and the coefficient c in the balance filter changed, whereas if $|r(k)|$ is less than v(k) only the reference level v(k) is decreased. At the beginning of the transmission, the leak signal h(t) is large compared with the remote signal ($b=+1$, $a=+1$ or $b=-1$, $a=-1$) and the reference level shall be increased simultaneously as c is increased, resulting in that $r(t)-y(t)+w(t)$ decreases. The balance filter then converges, according as the coefficient c increases and v(k) increases (the error signal $e_k$ becomes less and less). When the balance filter has converged, the received signal $r(t)=h(t) - y(t)+w(t)$ is very close to the remote signal, except for a residue error which is dependent on the magnitude of the stepping length of the parameters $c_k$ in the balance filter. The effect on the balance filter convergence being dependent on the remote signal has thereby been cancelled, and thereby also the above-mentioned problem with convergence of the balance filter.

An apparatus which performs the proposed method will now be described with reference to FIG. 8. In this Figure the transmitter unit S, hybrid coupler G and lowpass filter LP have been excluded. The signal $w(t)+h(t)$ is sent from the lowpass filter to the summing circuit A1, the other input of which receives a signal y(t) from the output of a digital-to-analogue converter DA1. The output signal $r(t)=w(t)+h(t) - y(t)$ is sampled in the circuit SH and gives a digital signal r(k) ($k=1,2, \ldots ,N$) at the sampling instants (sampling interval T) and with varying amplitude to the input of a quantizer Q. In the simple case illustrated this comprises an operational amplifier Q working as a comparator, its plus input being connected to the sampling circuit SH and its minus input being connected to the reference potential 0 (ground). The comparator Q thus decides whether the sampled signal's levels are greater or less than zero. Such an implementation of a quantizer can be used if only two levels of the incoming signal $w(t)+h(t)$ are to be detected. The output magnitude $â_k$ from the comparator Q is thus still 0 or 1.

The apparatus in accordance with the invention further includes: the reference unit V, having a memory unit MV, a digital-to-analogue converter DA2 connected to the output of the memory unit MV and a correlator KV including logic circuit E3 and a summing circuit A4 and two multipliers M3 and M4. A reference value v(k) is stored in the memory unit MV and is utilized in both comparators J1 and J2, after conversion to its analogue value in the converter DA2. The value v(k) can be updated in the memory unit MV via a write input connected to the output of a summing circuit A4. One input of the summing circuit A4 is connected to the output of the memory unit MV and the other to the output of the multiplier M4. The multiplier M3, connected to one input of the multiplier M4, forms a value $\beta \cdot vk$ which, in certain logical conditions, occurs on the output of the multiplier M4 and thereby gives a new value $(\beta+1)v(k)$ for writing into the memory unit MV.

The comparator units J1 and J2 are each connected with their minus and plus inputs to the output of the digital-to-analogue converter DA2, and with their plus and minus inputs connected to the output of the sampling circuit SH, across which the quantity r(k) occurs. An inverter circuit I1 is connected between the plus input of the comparator J2 and the converter DA2. The outputs of the comparators Q and J2 are connected to an AND circuit O1 with inverting inputs, the output of which is connected to one input of an OR circuit E1, the second input of which is connected to the comparator J1. The comparators J1 and J2 thus compare the sample values r(k) with the analogue value $+v(k)$ and −v(k), respectively, i.e. decide whether the sample values r(k) are above a positive reference level +v(k) or under a negative reference level −v(k). The logic O1, E1 subsequently takes on a state corresponding to the different cases which may occur (this is discussed in detail below).

To the outputs of the OR circuit E1 and the comparator Q there is connected a sign-forming circuit which comprises two AND gates O2 and O3, an exclusive-OR circuit E2 and three controllable switches K1-K3 for sending a +1, 0 or −1 state in response to the binary states at the respective gate outputs. The outputs of the switches are mutually connected to form the output of the sign-forming circuit. This output is connected to one input of a first multiplier M1, the second input of which is connected to a second multiplier M2. The value v(k) from the memory unit MV in the reference unit occurs at one input of the multiplier M2, and at the other input a constant value $\alpha$ (in digital form). In the case where the balance filter B is a conventional FIR filter containing delaying links and multipliers, the outputs of the units K1-K3 are connected to one input of a multiplier M5, its other input receiving the data flow $b_k$ (cf FIG. 2). In this case there is however a memory filter which is described below. A summing circuit A5 is connected by one input to the output of the multiplier M1 and by its other input it is connected to the output of a coefficient memory CM in the balance filter B. This may be an FIR filter, which is a known kind of memory filter. The filter B contains a shift register SB with N positions, an address register AE to form an address from the N values in the positions, and a coefficient memory CM. The shift register SB stores the values $b_k$, $b_{k-1}$, ... $b_{k-N+1}$. These values give an integer presentation a(bk). An address $j = a(b_k)$ is formed in the address register AE, to point out a given coefficient $c_j(k)$ in the coefficient memory CM. An array of digital values $c_j$ is obtained acrosss the output of the balance filter, these values being the signal y(t) via the converter DA1. The output of the summing circuit A5 is connected to an input of the memory CM for updating the coefficients $c_j(k)$ to $c_j(k+1)$. The signal y(t) is added to incoming analogue signal w(t) from the lowpass filter to form the signal r(t).

The operation of the apparatus will now be described in detail with reference to the time diagram according to FIG. 3. The binary data flow ($b_n$) transmitted from a data source (telephone exchange) to the transmitter unit S is illustrated in FIG. 3. The transmitter may include a conventional coding unit, which may convert the data flow $b_n$ to biphase code and a corresponding analogue biphase coded signal s(t) is shown in FIG. 3. As previously described, a part of the signal s(t) will pass through the coupler G and be added as the signal h(t) to the analogue biphase coded signal w(t) across the line L. After sampling the signal $r(t) = w(t) + h(t) - y(t)$ the sample values r(k) are obtained. The compartors Q and J1, J2 in FIG. 8 now decide whether these sample values are greater or less than zero and if their absolute values are greater than or less than the reference level v(k). If it is assumed that each of the comparators Q and J1, J2 give 1 if the level at the associated plus input is greater than the level over the minus input, and 0 if the level is less the following truth can be given:

|  | I | II | III | IV |
|---|---|---|---|---|
| Input, quantizer Q: | r(k)>0 and r(k)>v(k) | r(k)>0 and r(k)<v(k) | r(k)<0 and /r(k)/>/v(k)/ | r(k)<0 and /r(k)/</v(k) |
| Output ($a_k$) comparator Q: | 1 | 1 | 0 | 0 |
| Output, OR gate E1: | 1 | 0 | 0 | 1 |
| Output $\epsilon_k$ = sign $e_k$: | +1 | 0 | −1 | 0 |
| Output, summing circuit A5: | $\alpha \cdot v(k) \cdot b_k + c_j(k)$ | $c_j(k)$ | $c_j(k) - \alpha \cdot v(k) \cdot b_k$ | $c_j(k)$ |
| Output, summing circuit A4: | $(\beta + 1)v(k)$ | v(k) | $(\beta + 1)v(k)$ | v(k) |
| Output, E3: | 1 | 0 | 1 | 0 |

In cases I and III in the table above, the signal value r(k) is greater than the reference level v(k), resulting in that it will be increased by a factor $(1 + \beta)v(k)$. Furthermore, the filter parameters $c_j$ will be corrected by a factor $\alpha \cdot v(k)$.

In case I, this factor will be positive, i.e. the parameters will be increased if $b_k = 1$ and negative if $b_k = -1$, and in case III negative if $b_k = 1$ and positive if $b_k = -1$.

In cases II and IV, the signal value r(k) is less than the reference level v(k). This will then be decreased by the factor $(1 - \beta)v(k)$. On the other hand, the filter parameters $c_j$ are not corrected, since $\epsilon_k = 0$.

A residue error remains after convergence of the balance filter, the size of this error being in proportion to the size of the step lengths used in updating the parameters $c_j(k)$. For higher received r(k) signal levels, a larger residue error than for lower ones may be tolerated. Since the reference value v(k) is a measure of the signal strength of r(k), the convergence may be further accelerated if the step length is controlled by the reference value. In FIG. 1, a dashed connection has been denoted between the units V and Q, i.e. quantizing of the incoming sample values r(k) is dependent on the reference level v(k). At the start of the adjustment, r(k) is typically dominated by the contribution from the local transmittter S, i.e. h(k). The reference value v(k) then adapts itself to a level determined by the sample h(k) and the adaption is carried out with great step length. By degrees, as the convergence continues, r(k) diminishes and thereby the reference value v(k) until the balance filter B is completely converged, with the exception of an acceptable residue error.

What we claim is:

1. In a telecommunication system wherein digital information is transmitted in duplex via a hybrid circuit and a single conductor pair between first and second transmitter-receiver means, the method of minimizing at said first transmitter-receiver means disturbances in a line signal received via said single conductor pair and said hybrid circuit from said second transmitter receiver means when said first transmitter-receiver means is also transmitting signals representing data symbols $b_k$ to said second transmitter receiver means, said method comprising the steps of providing in said first transmitter-receiver means a balancing filter means for creating a plurality of balancing signals, subtracting a selected balancing signal from the line signal received from said second transmitter-receiver means and the disturbances arising from the signal being transmitted by said first transmitter-receiver means to provide a difference signal, periodically sampling the difference signal to generate a sampled signal, quantizing said sampled signals to form an estimation of the digital data represented by said line signal, generating a controllably variable reference signal, multiplying said reference signal by said estimation signal to form a product signal, substracting said sampled signal from said product signal to form an error signal correlating said error signal and said sampled signal, varying said controllably variable reference signal in response to said correlating step to decrease said error signal, adding said error signal to said sampled signal to form an auxiliary signal, correlating said auxiliary signal with a data symbol then represented by a transmitted signal and changing the selected balancing signal created by said balancing filter so that there is less correlation between said auxiliary signal and said data symbols whereby the influence on the convergence of said balance filter by said line signal is eliminated.

2. In a telecommunication system wherein digital information is transmitted in duplex via a hybrid circuit and a single conductor pair as a duplex path between first and transmitter-receiver means apparatus for minimizing at said first transmitter-receiver means disturbances in a line signal received via said single conductor pair and said hybrid circuit from said second transmitter-receiver means when said first transmitter-receiver means is also transmitting signals representing data symbols, said apparatus comprising a balance filter means including balancing signal generating means for generating a selected one of a plurality of balancing signals, first subtracting means for subtracting the balancing signal from the line signal received from said second transmitter-receiver means and the disturbances arising from the signal being transmitted by said first transmitter-receiver means to provide a difference signal, sampling means for periodically sampling said difference signal to generate a sampled signal, quantizing means for quantizing the sampled signal to form an estimation signal, controllably variable reference signal means for generating a reference signal, first multiplying means for multiplying the reference signal by the estimation signal to form a product signal, second subtracting means for subtracting the product signal from the sampled signal to provide an error signal, first correlating means for correlating the error signal and the sampled signal to generate a control signal to control said controllably variable reference signal means to vary the generated reference signal in such a manner to decrease the error signal, second correlation means for correlating the sum of the error signal and the sampled signal with the data symbol then represented by a transmitted signal to control said balance filter means to select such other balancing signal to lessen the correlation between the error signal and the sampled signal.

* * * * *